(12) United States Patent
Levesque

(10) Patent No.: US 9,065,505 B2
(45) Date of Patent: Jun. 23, 2015

(54) OPTIMAL SWITCHING FREQUENCY FOR ENVELOPE TRACKING POWER SUPPLY

(71) Applicant: RF Micro Devices, Inc., Greensboro, NC (US)

(72) Inventor: Chris Levesque, Fountain Valley, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 151 days.

(21) Appl. No.: 13/754,303

(22) Filed: Jan. 30, 2013

(65) Prior Publication Data

US 2013/0194979 A1  Aug. 1, 2013

Related U.S. Application Data

(60) Provisional application No. 61/592,900, filed on Jan. 31, 2012.

(51) Int. Cl.
*H04B 1/04* (2006.01)

(52) U.S. Cl.
CPC .................................. *H04B 1/0475* (2013.01)

(58) Field of Classification Search
USPC ................. 370/280, 281, 294, 295, 343, 345;
455/78, 87, 114.2, 114.3, 127.1, 196.1,
455/200.1, 205, 227, 255, 266, 271, 278.1,
455/296, 298, 299, 310, 311, 317, 321
See application file for complete search history.

(56) References Cited

U.S. PATENT DOCUMENTS

| | | |
|---|---|---|
| 3,735,289 A | 5/1973 | Bruene |
| 4,523,155 A | 6/1985 | Walczak et al. |
| 4,638,255 A | 1/1987 | Penney |
| 4,819,081 A | 4/1989 | Volk et al. |
| 5,212,459 A | 5/1993 | Ueda et al. |
| 5,278,994 A | 1/1994 | Black et al. |
| 5,307,512 A | 4/1994 | Mitzlaff |
| 5,343,307 A | 8/1994 | Mizuno et al. |
| 5,404,547 A | 4/1995 | Diamantstein et al. |
| 5,432,473 A | 7/1995 | Mattila et al. |

(Continued)

FOREIGN PATENT DOCUMENTS

GB  2444984 A  6/2008

OTHER PUBLICATIONS

3rd Generation Partnership Project; Technical Specification Group Radio Access Network; Evolved Universal Terrestrial Radio Access (E-UTRA); User Equipment (UE) radio transmission and reception (Release 10) dated Apr. 2011.*

(Continued)

*Primary Examiner* — Benjamin H Elliott, IV
(74) *Attorney, Agent, or Firm* — Withrow & Terranova, P.L.L.C.

(57) ABSTRACT

A radio frequency (RF) communications system, which includes an RF power amplifier (PA) and an envelope tracking power supply, is disclosed. The RF communications system processes RF signals associated with at least a first RF communications band, which has a first bandwidth. The RF PA receives and amplifies an RF input signal to provide an RF transmit signal using an envelope power supply signal. The envelope tracking power supply provides the envelope power supply signal, which has switching ripple based on a programmable switching frequency. The programmable switching frequency is selected to be greater that the first bandwidth.

23 Claims, 7 Drawing Sheets

(56) References Cited

U.S. PATENT DOCUMENTS

| | | |
|---|---|---|
| 5,603,106 A | 2/1997 | Toda |
| 5,636,114 A | 6/1997 | Bhagwat et al. |
| 5,640,686 A | 6/1997 | Norimatsu |
| 5,642,075 A | 6/1997 | Bell |
| 5,652,547 A | 7/1997 | Mokhtar et al. |
| 5,724,004 A | 3/1998 | Reif et al. |
| 5,832,373 A | 11/1998 | Nakanishi et al. |
| 5,841,319 A | 11/1998 | Sato |
| 5,852,632 A | 12/1998 | Capici et al. |
| 5,860,080 A | 1/1999 | James et al. |
| 5,872,481 A | 2/1999 | Sevic et al. |
| 5,874,841 A | 2/1999 | Majid et al. |
| 5,920,808 A | 7/1999 | Jones et al. |
| 5,923,153 A | 7/1999 | Liu |
| 5,923,761 A | 7/1999 | Lodenius |
| 5,945,870 A | 8/1999 | Chu et al. |
| 5,956,246 A | 9/1999 | Sequeira et al. |
| 6,051,963 A | 4/2000 | Eagar |
| 6,064,272 A | 5/2000 | Rhee |
| 6,151,509 A | 11/2000 | Chorey |
| 6,192,225 B1 * | 2/2001 | Arpaia et al. ............ 455/196.1 |
| 6,194,968 B1 | 2/2001 | Winslow |
| 6,229,366 B1 | 5/2001 | Balakirshnan et al. |
| 6,259,901 B1 | 7/2001 | Shinomiya et al. |
| 6,304,748 B1 | 10/2001 | Li et al. |
| 6,425,107 B1 | 7/2002 | Caldara et al. |
| 6,559,492 B1 | 5/2003 | Hazucha et al. |
| 6,606,483 B1 | 8/2003 | Baker et al. |
| 6,670,849 B1 | 12/2003 | Damgaard et al. |
| 6,674,789 B1 | 1/2004 | Fardoun et al. |
| 6,724,252 B2 | 4/2004 | Ngo et al. |
| 6,774,508 B2 | 8/2004 | Ballantyne et al. |
| 6,794,923 B2 | 9/2004 | Burt et al. |
| 6,806,768 B2 | 10/2004 | Klaren et al. |
| 6,853,244 B2 | 2/2005 | Robinson et al. |
| 6,888,482 B1 | 5/2005 | Hertle |
| 6,900,697 B1 | 5/2005 | Doyle et al. |
| 6,906,590 B2 | 6/2005 | Amano |
| 6,917,188 B2 | 7/2005 | Kernahan |
| 6,937,487 B1 | 8/2005 | Bron |
| 6,954,623 B2 | 10/2005 | Chang et al. |
| 6,969,978 B2 | 11/2005 | Dening |
| 6,998,914 B2 | 2/2006 | Robinson |
| 7,035,069 B2 | 4/2006 | Takikawa et al. |
| 7,043,213 B2 | 5/2006 | Robinson et al. |
| 7,058,374 B2 | 6/2006 | Levesque et al. |
| 7,072,626 B2 | 7/2006 | Hadjichristos |
| 7,075,346 B1 | 7/2006 | Hariman et al. |
| 7,098,728 B1 | 8/2006 | Mei et al. |
| 7,116,949 B2 | 10/2006 | Irie et al. |
| 7,145,385 B2 | 12/2006 | Brandt et al. |
| 7,148,749 B2 | 12/2006 | Rahman et al. |
| 7,154,336 B2 | 12/2006 | Maeda |
| 7,155,251 B2 | 12/2006 | Saruwatari et al. |
| 7,177,607 B2 | 2/2007 | Weiss |
| 7,184,731 B2 | 2/2007 | Kim |
| 7,184,749 B2 | 2/2007 | Marsh et al. |
| 7,187,910 B2 | 3/2007 | Kim et al. |
| 7,202,734 B1 | 4/2007 | Raab |
| 7,248,111 B1 | 7/2007 | Xu et al. |
| 7,263,337 B2 | 8/2007 | Struble |
| 7,276,960 B2 | 10/2007 | Peschke |
| 7,298,600 B2 | 11/2007 | Takikawa et al. |
| 7,299,015 B2 | 11/2007 | Iwamiya et al. |
| 7,324,787 B2 | 1/2008 | Kurakami et al. |
| 7,333,564 B2 | 2/2008 | Sugiyama et al. |
| 7,333,778 B2 | 2/2008 | Pehlke et al. |
| 7,342,455 B2 | 3/2008 | Behzad et al. |
| 7,358,807 B2 | 4/2008 | Scuderi et al. |
| 7,368,985 B2 | 5/2008 | Kusunoki |
| 7,372,333 B2 | 5/2008 | Abedinpour et al. |
| 7,408,330 B2 | 8/2008 | Zhao |
| 7,477,106 B2 | 1/2009 | Van Bezooijen et al. |
| 7,483,678 B2 | 1/2009 | Rozenblit et al. |
| 7,518,448 B1 | 4/2009 | Blair et al. |
| 7,529,523 B1 | 5/2009 | Young et al. |
| 7,539,462 B2 | 5/2009 | Peckham et al. |
| 7,551,688 B2 | 6/2009 | Matero et al. |
| 7,554,407 B2 | 6/2009 | Hau et al. |
| 7,558,539 B2 | 7/2009 | Huynh et al. |
| 7,580,443 B2 | 8/2009 | Uemura et al. |
| 7,622,900 B2 | 11/2009 | Komiya |
| 7,664,520 B2 | 2/2010 | Gu |
| 7,667,987 B2 | 2/2010 | Huynh et al. |
| 7,684,220 B2 | 3/2010 | Fang et al. |
| 7,689,182 B1 | 3/2010 | Bosley et al. |
| 7,701,290 B2 | 4/2010 | Liu |
| 7,702,300 B1 | 4/2010 | McCune |
| 7,714,546 B2 | 5/2010 | Kimura et al. |
| 7,724,097 B2 | 5/2010 | Carley et al. |
| 7,768,354 B2 | 8/2010 | Matsuda et al. |
| 7,782,141 B2 | 8/2010 | Witmer et al. |
| 7,783,272 B2 | 8/2010 | Magnusen |
| 7,787,570 B2 | 8/2010 | Rozenblit et al. |
| 7,796,410 B2 | 9/2010 | Takayanagi et al. |
| 7,859,511 B2 | 12/2010 | Shen et al. |
| 7,860,466 B2 | 12/2010 | Woo et al. |
| 7,876,159 B2 | 1/2011 | Wang et al. |
| 7,907,430 B2 | 3/2011 | Kularatna et al. |
| 7,941,110 B2 | 5/2011 | Gonzalez |
| 7,999,484 B2 | 8/2011 | Jurngwirth et al. |
| 8,000,117 B2 | 8/2011 | Petricek |
| 8,023,995 B2 | 9/2011 | Kuriyama et al. |
| 8,031,003 B2 | 10/2011 | Dishop |
| 8,085,106 B2 | 12/2011 | Huda et al. |
| 8,089,323 B2 | 1/2012 | Tarng et al. |
| 8,098,093 B1 | 1/2012 | Li |
| 8,131,234 B2 | 3/2012 | Liang et al. |
| 8,134,410 B1 | 3/2012 | Zortea |
| 8,149,050 B2 | 4/2012 | Cabanillas |
| 8,149,061 B2 | 4/2012 | Schuurmans |
| 8,213,888 B2 | 7/2012 | Kuriyama et al. |
| 8,228,122 B1 | 7/2012 | Yuen et al. |
| 8,258,875 B1 | 9/2012 | Smith et al. |
| 8,271,028 B2 | 9/2012 | Rabjohn |
| 8,427,120 B1 | 4/2013 | Cilio |
| 8,461,921 B2 | 6/2013 | Pletcher et al. |
| 8,514,025 B2 | 8/2013 | Lesso |
| 2002/0055376 A1 | 5/2002 | Norimatsu |
| 2002/0055378 A1 | 5/2002 | Imel et al. |
| 2003/0006845 A1 | 1/2003 | Lopez et al. |
| 2003/0042885 A1 | 3/2003 | Zhou et al. |
| 2003/0073418 A1 | 4/2003 | Dening et al. |
| 2003/0087626 A1 | 5/2003 | Prikhodko et al. |
| 2003/0201674 A1 | 10/2003 | Droppo et al. |
| 2003/0201834 A1 | 10/2003 | Pehlke |
| 2003/0227280 A1 | 12/2003 | Vinciarelli |
| 2004/0068673 A1 | 4/2004 | Espinoza-Ibarra et al. |
| 2004/0090802 A1 * | 5/2004 | Pourseyed et al. ............. 363/39 |
| 2004/0095118 A1 | 5/2004 | Kernahan |
| 2004/0127173 A1 | 7/2004 | Leizerovich |
| 2004/0183507 A1 | 9/2004 | Amei |
| 2004/0185805 A1 | 9/2004 | Kim et al. |
| 2004/0192369 A1 | 9/2004 | Nilsson |
| 2004/0222848 A1 | 11/2004 | Shih et al. |
| 2004/0235438 A1 | 11/2004 | Quilisch et al. |
| 2005/0003855 A1 | 1/2005 | Wada et al. |
| 2005/0017787 A1 | 1/2005 | Kojima |
| 2005/0046507 A1 | 3/2005 | Dent |
| 2005/0064830 A1 * | 3/2005 | Grigore ................... 455/127.4 |
| 2005/0088237 A1 | 4/2005 | Gamero et al. |
| 2005/0110559 A1 | 5/2005 | Farkas et al. |
| 2005/0134388 A1 | 6/2005 | Jenkins |
| 2005/0136854 A1 | 6/2005 | Akizuki et al. |
| 2005/0136866 A1 | 6/2005 | Dupuis |
| 2005/0168281 A1 | 8/2005 | Nagamori et al. |
| 2005/0200407 A1 | 9/2005 | Arai et al. |
| 2005/0227644 A1 | 10/2005 | Maslennikov et al. |
| 2005/0245214 A1 | 11/2005 | Nakamura et al. |
| 2005/0280471 A1 | 12/2005 | Matsushita et al. |
| 2005/0288052 A1 | 12/2005 | Carter et al. |
| 2005/0289375 A1 | 12/2005 | Ranganathan et al. |
| 2006/0006943 A1 | 1/2006 | Clifton et al. |
| 2006/0017426 A1 | 1/2006 | Yang et al. |

(56) References Cited

U.S. PATENT DOCUMENTS

| | | |
|---|---|---|
| 2006/0038710 A1 | 2/2006 | Staszewski et al. |
| 2006/0046666 A1 | 3/2006 | Hara et al. |
| 2006/0046668 A1 | 3/2006 | Uratani et al. |
| 2006/0052065 A1 | 3/2006 | Argaman et al. |
| 2006/0067425 A1 | 3/2006 | Windisch |
| 2006/0067426 A1 | 3/2006 | Maltsev et al. |
| 2006/0084398 A1 | 4/2006 | Chmiel et al. |
| 2006/0114075 A1 | 6/2006 | Janosevic et al. |
| 2006/0119331 A1 | 6/2006 | Jacobs et al. |
| 2006/0128325 A1* | 6/2006 | Levesque et al. ........... 455/127.1 |
| 2006/0146956 A1 | 7/2006 | Kim et al. |
| 2006/0199553 A1* | 9/2006 | Kenington ................. 455/127.1 |
| 2006/0221646 A1 | 10/2006 | Ye et al. |
| 2006/0226909 A1 | 10/2006 | Abedinpour et al. |
| 2006/0290444 A1 | 12/2006 | Chen |
| 2006/0293005 A1 | 12/2006 | Hara et al. |
| 2007/0024360 A1 | 2/2007 | Markowski |
| 2007/0026824 A1 | 2/2007 | Ono et al. |
| 2007/0032201 A1 | 2/2007 | Behzad et al. |
| 2007/0069820 A1 | 3/2007 | Hayata et al. |
| 2007/0096806 A1 | 5/2007 | Sorrells et al. |
| 2007/0096810 A1 | 5/2007 | Hageman et al. |
| 2007/0129025 A1 | 6/2007 | Vasa et al. |
| 2007/0146090 A1 | 6/2007 | Carey et al. |
| 2007/0182490 A1 | 8/2007 | Hau et al. |
| 2007/0210776 A1 | 9/2007 | Oka |
| 2007/0222520 A1 | 9/2007 | Inamori et al. |
| 2007/0249300 A1 | 10/2007 | Sorrells et al. |
| 2007/0249304 A1 | 10/2007 | Snelgrove et al. |
| 2007/0281635 A1 | 12/2007 | McCallister et al. |
| 2007/0291873 A1 | 12/2007 | Saito et al. |
| 2008/0003950 A1 | 1/2008 | Haapoja et al. |
| 2008/0008273 A1 | 1/2008 | Kim et al. |
| 2008/0009248 A1 | 1/2008 | Rozenblit et al. |
| 2008/0023825 A1 | 1/2008 | Hebert et al. |
| 2008/0036532 A1 | 2/2008 | Pan |
| 2008/0051044 A1 | 2/2008 | Takehara |
| 2008/0057883 A1 | 3/2008 | Pan |
| 2008/0081572 A1 | 4/2008 | Rofougaran |
| 2008/0136559 A1 | 6/2008 | Takahashi et al. |
| 2008/0157732 A1 | 7/2008 | Williams |
| 2008/0169792 A1 | 7/2008 | Orr |
| 2008/0205547 A1 | 8/2008 | Rofougaran |
| 2008/0233913 A1 | 9/2008 | Sivasubramaniam |
| 2008/0278136 A1 | 11/2008 | Murtojarvi |
| 2008/0278236 A1 | 11/2008 | Seymour |
| 2009/0004981 A1 | 1/2009 | Eliezer et al. |
| 2009/0011787 A1 | 1/2009 | Kikuma |
| 2009/0021302 A1 | 1/2009 | Elia |
| 2009/0059630 A1 | 3/2009 | Williams |
| 2009/0068966 A1 | 3/2009 | Drogi et al. |
| 2009/0104900 A1 | 4/2009 | Lee |
| 2009/0115520 A1 | 5/2009 | Ripley et al. |
| 2009/0153250 A1 | 6/2009 | Rofougaran |
| 2009/0163153 A1 | 6/2009 | Senda et al. |
| 2009/0163157 A1 | 6/2009 | Zolfaghari |
| 2009/0176464 A1 | 7/2009 | Liang et al. |
| 2009/0191826 A1 | 7/2009 | Takinami et al. |
| 2009/0258611 A1 | 10/2009 | Nakamura et al. |
| 2009/0264091 A1 | 10/2009 | Jensen et al. |
| 2009/0274207 A1 | 11/2009 | O'Keeffe et al. |
| 2009/0285331 A1 | 11/2009 | Sugar et al. |
| 2009/0289719 A1 | 11/2009 | Van Bezooijen et al. |
| 2009/0311980 A1 | 12/2009 | Sjoland |
| 2009/0322304 A1 | 12/2009 | Oraw et al. |
| 2010/0007412 A1 | 1/2010 | Wang et al. |
| 2010/0007414 A1 | 1/2010 | Searle et al. |
| 2010/0007433 A1 | 1/2010 | Jensen |
| 2010/0013548 A1 | 1/2010 | Barrow |
| 2010/0020899 A1 | 1/2010 | Szopko et al. |
| 2010/0027596 A1 | 2/2010 | Bellaouar et al. |
| 2010/0029224 A1 | 2/2010 | Urushihara et al. |
| 2010/0052794 A1 | 3/2010 | Rofougaran |
| 2010/0097104 A1 | 4/2010 | Yang et al. |
| 2010/0102789 A1 | 4/2010 | Randall |
| 2010/0109561 A1 | 5/2010 | Chen et al. |
| 2010/0120384 A1 | 5/2010 | Pennec |
| 2010/0120475 A1 | 5/2010 | Taniuchi et al. |
| 2010/0123447 A1 | 5/2010 | Vecera et al. |
| 2010/0127781 A1 | 5/2010 | Inamori et al. |
| 2010/0128689 A1 | 5/2010 | Yoon et al. |
| 2010/0164579 A1 | 7/2010 | Acatrinei |
| 2010/0176869 A1 | 7/2010 | Horie et al. |
| 2010/0181980 A1 | 7/2010 | Richardson |
| 2010/0189042 A1 | 7/2010 | Pan |
| 2010/0222015 A1 | 9/2010 | Shimizu et al. |
| 2010/0233977 A1 | 9/2010 | Minnis et al. |
| 2010/0237944 A1 | 9/2010 | Pierdomenico et al. |
| 2010/0244788 A1 | 9/2010 | Chen |
| 2010/0291888 A1 | 11/2010 | Hadjichristos et al. |
| 2010/0295599 A1 | 11/2010 | Uehara et al. |
| 2010/0311362 A1 | 12/2010 | Lee et al. |
| 2011/0018516 A1 | 1/2011 | Notman et al. |
| 2011/0018632 A1 | 1/2011 | Pletcher et al. |
| 2011/0018640 A1 | 1/2011 | Liang et al. |
| 2011/0032030 A1 | 2/2011 | Ripley et al. |
| 2011/0051842 A1 | 3/2011 | van der Heijden et al. |
| 2011/0068768 A1 | 3/2011 | Chen et al. |
| 2011/0068873 A1 | 3/2011 | Alidio et al. |
| 2011/0075772 A1 | 3/2011 | Sethi et al. |
| 2011/0080205 A1 | 4/2011 | Lee |
| 2011/0095735 A1 | 4/2011 | Lin |
| 2011/0123048 A1 | 5/2011 | Wang et al. |
| 2011/0136452 A1 | 6/2011 | Pratt et al. |
| 2011/0181115 A1 | 7/2011 | Ivanov |
| 2011/0234187 A1* | 9/2011 | Brown et al. ................. 323/282 |
| 2011/0273152 A1 | 11/2011 | Weir |
| 2011/0298538 A1 | 12/2011 | Andrys et al. |
| 2011/0309884 A1 | 12/2011 | Dishop |
| 2011/0312287 A1* | 12/2011 | Ramachandran et al. ...... 455/77 |
| 2012/0044022 A1 | 2/2012 | Walker et al. |
| 2012/0064953 A1 | 3/2012 | Dagher et al. |
| 2012/0117284 A1 | 5/2012 | Southcombe et al. |
| 2012/0170690 A1 | 7/2012 | Ngo et al. |
| 2012/0223773 A1 | 9/2012 | Jones et al. |
| 2012/0229210 A1 | 9/2012 | Jones et al. |
| 2012/0235736 A1 | 9/2012 | Levesque et al. |
| 2012/0236958 A1 | 9/2012 | Deng et al. |
| 2012/0242413 A1 | 9/2012 | Lesso |
| 2012/0252382 A1 | 10/2012 | Bashir et al. |
| 2013/0005286 A1 | 1/2013 | Chan et al. |
| 2013/0194979 A1* | 8/2013 | Levesque ..................... 370/278 |
| 2013/0307616 A1 | 11/2013 | Berchtold et al. |
| 2013/0342270 A1 | 12/2013 | Baxter et al. |
| 2013/0344828 A1 | 12/2013 | Baxter et al. |
| 2013/0344833 A1 | 12/2013 | Baxter et al. |
| 2014/0119070 A1 | 5/2014 | Jeong et al. |

OTHER PUBLICATIONS

Author Unknown, "SKY77344-21 Power Amplifier Module—Evaluation Information," Skyworks, Version 21, Feb. 16, 2010, 21 pages.

Author Unknown, "60mA, 5.0V, Buck/Boost Charge Pump in ThinSOT-23 and ThinQFN", Texas Instruments Incorporated, REG710, SBAS221F, Dec. 2001, revised Mar. 2008, 23 pages.

Author Unknown, "DC-to-DC Converter Combats EMI," Maxim Integrated Products, Application Note 1077, May 28, 2002, 4 pages, http://www.maxim-ic.com/an1077/.

Author Unknown, "MIPI Alliance Specification for RF Front-End Control Interface", Mobile Industry Processor Interface (MIPI) Alliance, Version 1.00.00, May 3, 2010, approved Jul. 16, 2010, 88 pages.

Bastida, E.M. et al., "Cascadable Monolithic Balanced Amplifiers at Microwave Frequencies," 10th European Microwave Conference, Sep. 8-12, 1980, pp. 603-607.

Berretta, G. et al., "A balanced CDMA2000 SiGe HBT load insensitive power amplifier," 2006 IEEE Radio and Wireless Symposium, Jan. 17-19, 2006, pp. 523-526.

Grebennikov, A. et al., "High-Efficiency Balanced Switched-Path Monolithic SiGe HBT Power Amplifiers for Wireless Applications," Proceedings of the 2nd European Microwave Integrated Circuits Conference, Oct. 8-10, 2007, pp. 391-394.

(56) References Cited

OTHER PUBLICATIONS

Grebennikov, A., "Circuit Design Technique for High Efficiency Class F Amplifiers," 2000 IEEE International Microwave Symposium Digest, vol. 2, Jun. 11-16, 2000, pp. 771-774.

Kurokawa, K., "Design Theory of Balanced Transistor Amplifiers," Bell System Technical Journal, vol. 44, Oct. 1965, pp. 1675-1698, Bell Labs.

Li, Y. et al., "LTE power amplifier module design: challenges and trends," IEEE International Conference on Solid-State and Integrated Circuit Technology, Nov. 2010, pp. 192-195.

Mandeep, J.S. et al., "A Compact, Balanced Low Noise Amplifier for WiMAX Base Station Applications", Microwave Journal, vol. 53, No. 11, Nov. 2010, p. 84-92.

Noriega, Fernando et al., "Designing LC Wilkinson power splitters," RF interconnects/interfaces, Aug. 2002, pp. 18-24, www.rfdesign.com.

Pampichai, Samphan et al., "A 3-dB Lumped-Distributed Miniaturized Wilkinson Divider," Electrical Engineering Conference (EECON-23), Nov. 2000, pp. 329-332.

Podcameni, A.B. et al., "An Amplifier Linearization Method Based on a Quadrature Balanced Structure," IEEE Transactions on Broadcasting, vol. 48, No. 2, Jun. 2002, p. 158-162.

Scuderi, A. et al., "Balanced SiGe PA Module for Multi-Band and Multi-Mode Cellular-Phone Applications," Digest of Technical Papers, 2008 IEEE International Solid-State Circuits Conference, Feb. 3-7, 2008, pp. 572-573, 637.

Wang, P. et al., "A 2.4-GHz +25dBm P-1dB Linear Power Amplifier with Dynamic Bias Control in a 65-nm CMOS Process," 2008 European Solid-State Circuits Conference, Sep. 15-19, 2008, pp. 490-493.

Zhang, G. et al., "A High Performance Balanced Power Amplifier and Its Integration into a Front-end Module at PCS Band," 2007 IEEE Radio Frequency Integrated Circuits Symposium, Jun. 3-5, 2007, p. 251-254.

Zhang, G. et al., "Dual Mode Efficiency Enhanced Linear Power Amplifiers Using a New Balanced Structure," 2009 IEEE Radio Frequency Integrated Circuits Symposium, Jun. 7-9, 2009, pp. 245-248.

Non-Final Office Action for U.S. Appl. No. 11/756,909, mailed May 15, 2009, 11 pages.

Final Office Action for U.S. Appl. No. 11/756,909, mailed Nov. 18, 2009, 14 pages.

Notice of Allowance for U.S. Appl. No. 11/756,909, mailed Dec. 23, 2010, 7 pages.

Non-Final Office Action for U.S. Appl. No. 12/433,377, mailed Jun. 16, 2011, 7 pages.

Notice of Allowance for U.S. Appl. No. 12/433,377, mailed Oct. 31, 2011, 8 pages.

Non-Final Office Action for U.S. Appl. No. 12/567,318, mailed May 29, 2012, 7 pages.

Final Office Action for U.S. Appl. No. 12/567,318, mailed Oct. 22, 2012, 7 pages.

Non-Final Office Action for U.S. Appl. No. 12/567,318, mailed Apr. 2, 2013, 5 pages.

Final Office Action for U.S. Appl. No. 12/567,318, mailed Jul. 19, 2013, 7 pages.

Advisory Action for U.S. Appl. No. 12/567,318, mailed Aug. 27, 2013, 3 pages.

Non-Final Office Action for U.S. Appl. No. 12/567,318, mailed Oct. 24, 2013, 6 pages.

Non-Final Office Action for U.S. Appl. No. 12/723,738, mailed Dec. 20, 2012, 7 pages.

Non-Final Office Action for U.S. Appl. No. 12/774,155, mailed Jun. 21, 2012, 13 pages.

Final Office Action for U.S. Appl. No. 12/774,155, mailed Jan. 31, 2013, 15 pages.

Final Office Action for U.S. Appl. No. 12/774,155, mailed Apr. 18, 2013, 15 pages.

Advisory Action for U.S. Appl. No. 12/774,155, mailed Jun. 4, 2013, 3 pages.

Non-Final Office Action for U.S. Appl. No. 12/774,155, mailed Aug. 15, 2013, 15 pages.

Non-Final Office Action for U.S. Appl. No. 12/749,091, mailed Mar. 25, 2013, 9 pages.

Notice of Allowance for U.S. Appl. No. 12/749,091, mailed May 20, 2013, 9 pages.

Notice of Allowance for U.S. Appl. No. 12/773,292, mailed Feb. 22, 2012, 11 pages.

Notice of Allowance for U.S. Appl. No. 12/773,292, mailed Jul. 16, 2012, 12 pages.

Quayle Action for U.S. Appl. No. 13/198,074, mailed Jan. 22, 2013, 5 pages.

Notice of Allowance for U.S. Appl. No. 13/198,074, mailed Apr. 12, 2013, 8 pages.

Notice of Allowance for U.S. Appl. No. 13/090,663, mailed Nov. 28, 2012, 8 pages.

Non-Final Office Action for U.S. Appl. No. 13/019,777, mailed Feb. 19, 2013, 9 pages.

Notice of Allowance for U.S. Appl. No. 13/019,077, mailed May 24, 2013, 9 pages.

Invitation to Pay Additional Fees and, Where Applicable, Protest Fee for PCT/US2011/050633, mailed Aug. 22, 2012, 5 pages.

International Search Report and Written Opinion for PCT/US2011/050633, mailed Mar. 8, 2013, 23 pages.

International Preliminary Report on Patentability for PCT/US2011/050633, mailed Mar. 28, 2013, 17 pages.

Non-Final Office Action for U.S. Appl. No. 13/289,134, mailed Feb. 6, 2013, 13 pages.

Notice of Allowance for U.S. Appl. No. 13/289,134, mailed Jun. 6, 2013, 8 pages.

Notice of Allowance for U.S. Appl. No. 12/774,155, mailed Jun. 20, 2014, 8 pages.

Non-Final Office Action for U.S. Appl. No. 14/010,617, mailed Jul. 16, 2014, 6 pages.

Non-Final Office Action for U.S. Appl. No. 14/010,643, mailed Jul. 18, 2014, 6 pages.

Non-Final Office Action for U.S. Appl. No. 13/172,371, mailed Jun. 16, 2014, 7 pages.

Notice of Allowance for U.S. Appl. No. 13/287,726, mailed Aug. 4, 2014, 7 pages.

Non-Final Office Action for U.S. Appl. No. 13/287,672, mailed Jul. 28, 2014, 12 pages.

Non-Final Office Action for U.S. Appl. No. 13/289,302, mailed Jun. 16, 2014, 7 pages.

Notice of Allowance for U.S. Appl. No. 13/304,762, mailed May 29, 2014, 7 pages.

Non-Final Office Action for U.S. Appl. No. 13/773,888, mailed Jun. 10, 2014, 15 pages.

Notice of Allowance for U.S. Appl. No. 12/567,318, mailed Feb. 18, 2014, 8 pages.

Non-Final Office Action for U.S. Appl. No. 12/723,738, mailed Apr. 28, 2014, 14 pages.

Advisory Action for U.S. Appl. No. 13/287,713, mailed Feb. 20, 2014, 4 pages.

Non-Final Office Action for U.S. Appl. No. 13/288,517, mailed Apr. 28, 2014, 10 pages.

Non-Final Office Action for U.S. Appl. No. 13/226,843, mailed Mar. 31, 2014, 7 pages.

Notice of Allowance for U.S. Appl. No. 13/288,273, mailed Apr. 25, 2014, 7 pages.

Notice of Allowance for U.S. Appl. No. 13/288,373, mailed May 7, 2014, 7 pages.

Non-Final Office Action for U.S. Appl. No. 13/288,590, mailed May 8, 2014, 11 pages.

Notice of Allowance for U.S. Appl. No. 13/304,762, mailed Apr. 16, 2014, 7 pages.

Final Office Action for U.S. Appl. No. 13/226,777, mailed Mar. 21, 2014, 13 pages.

Non-Final Office Action for U.S. Appl. No. 13/656,997, mailed Apr. 30, 2014, 8 pages.

Non-Final Office Action for U.S. Appl. No. 12/774,155, mailed Dec. 4, 2013, 18 pages.

(56) References Cited

OTHER PUBLICATIONS

Final Office Action for U.S. Appl. No. 13/287,713, mailed Dec. 6, 2013, 9 pages.
Notice of Allowance for U.S. Appl. No. 13/288,478, mailed Nov. 18, 2013, 9 pages.
Non-Final Office Action for U.S. Appl. No. 13/288,517, mailed Oct. 31, 2013, 10 pages.
Non-Final Office Action for U.S. Appl. No. 13/288,373, mailed Nov. 19, 2013, 5 pages.
Non-Final Office Action for U.S. Appl. No. 13/288,590, mailed Dec. 5, 2013, 8 pages.
Notice of Allowance for U.S. Appl. No. 13/304,735, mailed Jan. 2, 2014, 8 pages.
Notice of Allowance for U.S. Appl. No. 13/304,796, mailed Dec. 5, 2013, 9 pages.
Notice of Allowance for U.S. Appl. No. 13/304,943, mailed Dec. 5, 2013, 9 pages.
Advisory Action for U.S. Appl. No. 13/226,814, mailed Dec. 31, 2013, 3 pages.
Final Office Action for U.S. Appl. No. 13/479,816, mailed Nov. 1, 2013, 15 pages.
Advisory Action for U.S. Appl. No. 13/479,816, mailed Jan. 7, 2014, 3 pages.
Non-Final Office Action for U.S. Appl. No. 13/656,997, mailed Jan. 13, 2014, 6 pages.
Non-Final Office Action for U.S. Appl. No. 13/287,726, mailed Jan. 25, 2013, 11 pages.
Non-Final Office Action for U.S. Appl. No. 13/287,726, mailed May 16, 2013, 9 pages.
Notice of Allowance for U.S. Appl. No. 13/287,726, mailed Oct. 7, 2013, 9 pages.
Non-Final Office Action for U.S. Appl. No. 13/287,713, mailed Aug. 5, 2013, 7 pages.
Non-Final Office Action for U.S. Appl. No. 13/287,735, mailed Jan. 25, 2013, 11 pages.
Notice of Allowance for U.S. Appl. No. 13/287,735, mailed May 28, 2013, 8 pages.
Non-Final Office Action for U.S. Appl. No. 13/288,318, mailed Feb. 5, 2013, 12 pages.
Non-Final Office Action for U.S. Appl. No. 13/288,318, mailed Jun. 3, 2013, 14 pages.
Notice of Allowance for U.S. Appl. No. 13/288,318, mailed Oct. 24, 2013, 9 pages.
Non-Final Office Action for U.S. Appl. No. 13/288,478, mailed Dec. 26, 2012, 8 pages.
Non-Final Office Action for U.S. Appl. No. 13/288,478, mailed Jun. 3, 2013, 9 pages.
Non-Final Office Action for U.S. Appl. No. 13/288,517, mailed Dec. 11, 2012, 9 pages.
Non-Final Office Action for U.S. Appl. No. 13/288,517, mailed May 16, 2013, 9 pages.
Non-Final Office Action for U.S. Appl. No. 13/226,843, mailed Mar. 4, 2013, 6 pages.
Final Office Action for U.S. Appl. No. 13/226,843, mailed Jul. 10, 2013, 7 pages.
Advisory Action for U.S. Appl. No. 13/226,843, mailed Sep. 17, 2013, 3 pages.
Non-Final Office Action for U.S. Appl. No. 13/226,843, mailed Oct. 29, 2013, 7 pages.
Non-Final Office Action for U.S. Appl. No. 13/288,273, mailed Feb. 5, 2013, 8 pages.
Non-Final Office Action for U.S. Appl. No. 13/288,273, mailed May 30, 2013, 11 pages.
Notice of Allowance for U.S. Appl. No. 13/288,273 mailed Oct. 24, 2013 9 pages.
Non-Final Office Action for U.S. Appl. No. 13/288,373, mailed Feb. 25, 2013, 6 pages.
Final Office Action for U.S. Appl. No. 13/288,373, mailed Aug. 2, 2013, 7 pages.
Advisory Action for U.S. Appl. No. 13/288,373, mailed Oct. 15, 2013, 3 pages.
Non-Final Office Action for U.S. Appl. No. 13/289,379, mailed Feb. 25, 2013, 9 pages.
Notice of Allowance for U.S. Appl. No. 13/289,379, mailed Jun. 6, 2013, 9 pages.
Non-Final Office Action for U.S. Appl. No. 13/304,735, mailed Jul. 11, 2013, 8 pages.
Non-Final Office Action for U.S. Appl. No. 13/304,796, mailed Jul. 17, 2013, 8 pages.
Non-Final Office Action for U.S. Appl. No. 13/304,744, mailed Jan. 24, 2013, 10 pages.
Final Office Action for U.S. Appl. No. 13/304,744, mailed May 30, 2013, 12 pages.
Advisory Action for U.S. Appl. No. 13/304,744, mailed Aug. 2, 2013, 3 pages.
Advisory Action for U.S. Appl. No. 13/304,744, mailed Sep. 13, 2013, 3 pages.
Non-Final Office Action for U.S. Appl. No. 13/304,744, mailed Oct. 21, 2013, 12 pages.
Non-Final Office Action for U.S. Appl. No. 13/305,763, mailed Mar. 8, 2013, 10 pages.
Final Office Action for U.S. Appl. No. 13/305,763, mailed Jun. 24, 2013, 13 pages.
Notice of Allowance for U.S. Appl. No. 13/305,763, mailed Sep. 16, 2013, 6 pages.
Notice of Allowance for U.S. Appl. No. 13/304,762, mailed Nov. 27, 2012, 7 pages.
Notice of Allowance for U.S. Appl. No. 13/304,762, mailed Mar. 5, 2013, 7 pages.
Non-Final Office Action for U.S. Appl. No. 13/304,943, mailed Jul. 23, 2013, 8 pages.
Notice of Allowance for U.S. Appl. No. 13/226,777, mailed May 28, 2013, 8 pages.
Non-Final Office Action for U.S. Appl. No. 13/226,777, mailed Oct. 18, 2013, 10 pages.
Notice of Allowance for U.S. Appl. No. 13/226,797, mailed Apr. 26, 2013, 8 pages.
Non-Final Office Action for U.S. Appl. No. 13/226,814, mailed Jun. 13, 2013, 13 pages.
Final Office Action for U.S. Appl. No. 13/226,814, mailed Oct. 23, 2013, 21 pages.
Non-Final Office Action for U.S. Appl. No. 13/479,816, mailed Jul. 5, 2013, 13 pages.
Li, C.H., "Quadrature Power Amplifier for RF Applications," Master's Thesis for the University of Twente, Nov. 2009, 102 pages.
Non-Final Office Action for U.S. Appl. No. 13/226,831, mailed Nov. 3, 2014, 12 pages.
Non-Final Office Action for U.S. Appl. No. 13/479,816, mailed Nov. 4, 2014, 11 pages.
Non-Final Office Action for U.S. Appl. No. 13/845,410, mailed Oct. 2, 2014, 5 pages.
Final Office Action for U.S. Appl. No. 12/723,738, mailed Aug. 11, 2014, 10 pages.
Non-Final Office Action for U.S. Appl. No. 14/010,630, mailed Aug. 6, 2014, 7 pages.
Notice of Allowance for U.S. Appl. No. 13/288,517, mailed Aug. 15, 2014, 7 pages.
Notice of Allowance for U.S. Appl. No. 13/656,997, mailed Sep. 2, 2014, 7 pages.
Notice of Allowance for U.S. Appl. No. 13/761,500, mailed Sep. 19, 2014, 7 pages.
Non-Final Office Action for U.S. Appl. No. 12/723,738, mailed Dec. 10, 2014, 11 pages.
Notice of Allowance for U.S. Appl. No. 14/010,617, mailed Dec. 16, 2014, 7 pages.
Notice of Allowance for U.S. Appl. No. 14/010,630, mailed Dec. 31, 2014, 9 pages.
Non-Final Office Action for U.S. Appl. No. 14/010,643, mailed Dec. 9, 2014, 7 pages.
Notice of Allowance for U.S. Appl. No. 13/911,526, mailed Dec. 12, 2014, 9 pages.

(56) References Cited

OTHER PUBLICATIONS

Final Office Action for U.S. Appl. No. 13/287,672, mailed Dec. 8, 2014, 14 pages.
Final Office Action for U.S. Appl. No. 13/773,888, mailed Dec. 26, 2014, 18 pages.
Final Office Action for U.S. Appl. No. 12/723,738, mailed Mar. 20, 2015, 11 pages.
Final Office Action for U.S. Appl. No. 14/010,643, mailed May 5, 2015, 8 pages.
Final Office Action for U.S. Appl. No. 13/226,831, mailed Mar. 6, 2015, 6 pages.
Non-Final Office Action for U.S. Appl. No. 13/937,810, mailed Mar. 5, 2015, 5 pages.
Non-Final Office Action for U.S. Appl. No. 13/287,672, mailed Mar. 23, 2015, 7 pages.

\* cited by examiner

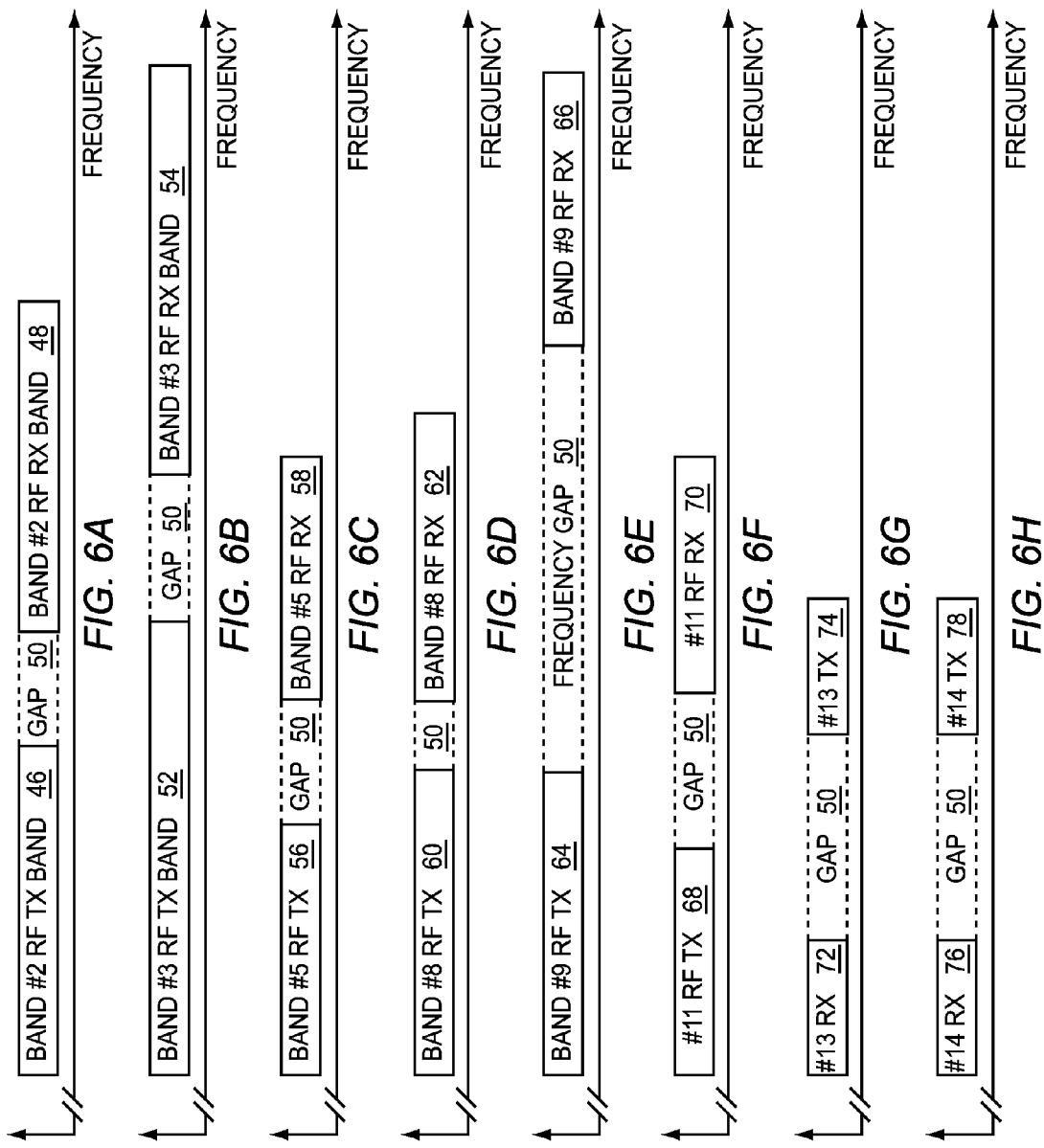

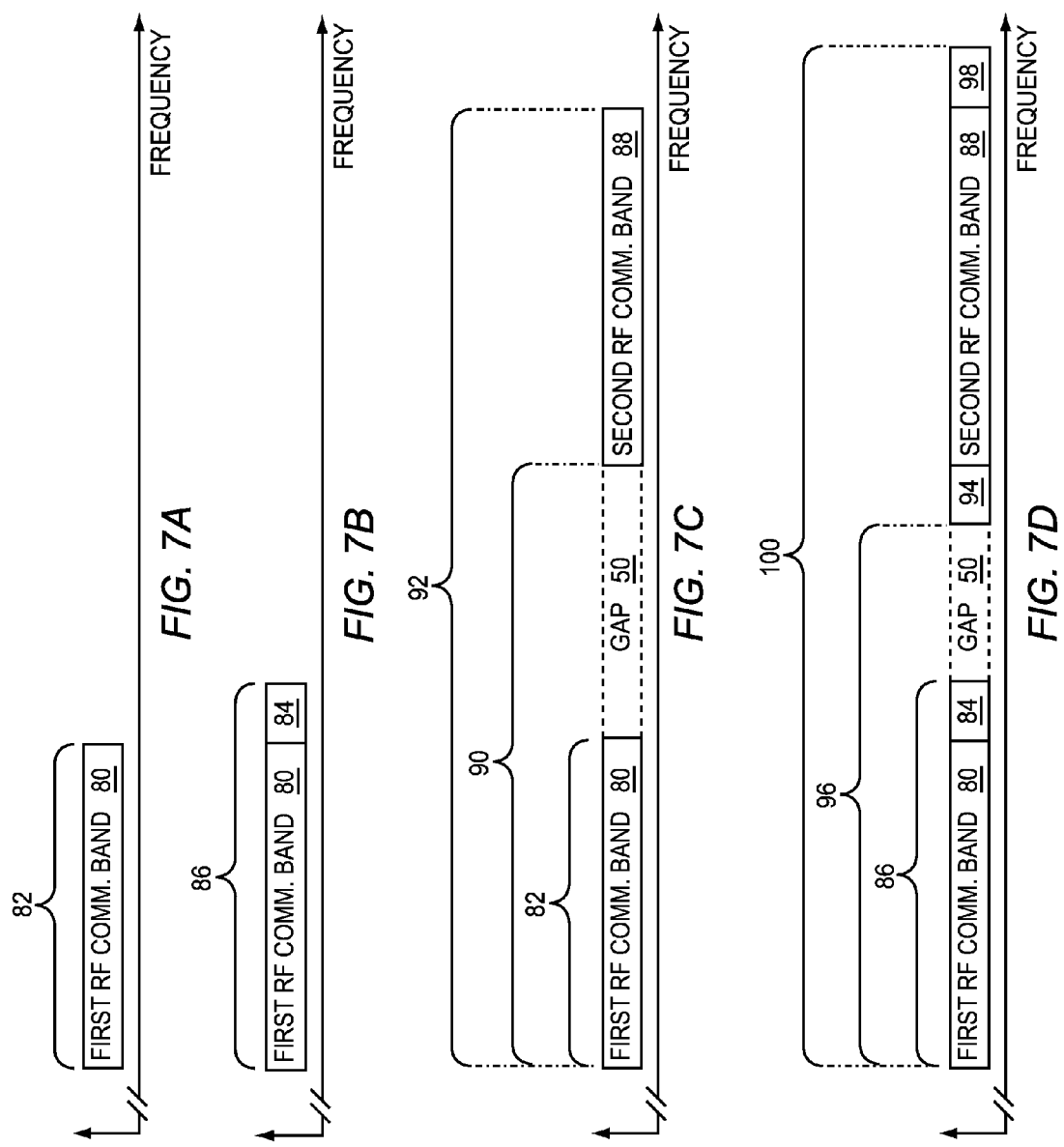

OPTIMAL SWITCHING FREQUENCY FOR ENVELOPE TRACKING POWER SUPPLY

RELATED APPLICATIONS

This application claims the benefit of U.S. provisional patent application No. 61/592,900, filed Jan. 31, 2012, the disclosure of which is incorporated herein by reference in its entirety.

FIELD OF THE DISCLOSURE

Embodiments of the present disclosure relate to switching power supplies used in radio frequency (RF) communication systems.

BACKGROUND

As RF communications protocols evolve, data rates tend to increase, which tends to cause bandwidths of transmitted RF signals to increase to support the higher data rates. However, in comparison to the increased bandwidths of the transmitted RF signals, duplex frequency spacings between transmitted and received RF signals may be relatively small, thereby putting tight constraints on RF communications systems. Such RF communications systems may have certain performance requirements, such as specific out-of-band emissions requirements, linearity requirements, or the like. Further, RF transmitters need to be as efficient as possible to maximize battery life. Therefore, transmitter power amplifiers may be powered from switching converter-based envelope power supplies to maximize efficiency. As such, noise generated by the envelope power supplies may need to be minimized to meet the noise requirements of the RF communications system.

SUMMARY

Embodiments of the present disclosure relate to an RF communications system, which includes an RF power amplifier (PA) and an envelope tracking power supply. The RF communications system processes RF signals associated with at least a first RF communications band, which has a first bandwidth. The RF PA receives and amplifies an RF input signal to provide an RF transmit signal using an envelope power supply signal. The envelope tracking power supply provides the envelope power supply signal, which has switching ripple based on a programmable switching frequency. The programmable switching frequency is selected to be greater that the first bandwidth.

In one embodiment of the RF communications systems, noise requirements are stricter inside RF transmit bands and RF receive bands than outside of the RF transmit bands and the RF receive bands. The switching ripple may introduce noise into an RF transmit path, an RF receive path, or both of the RF communications system. The first RF communications band may be an RF transmit band, an RF receive band, or both. As such, since the programmable switching frequency is greater that the first bandwidth, the switching ripple falls outside of the first RF communications band where noise requirements are less strict.

In one embodiment of the RF communications system, the first RF communications band is a time division duplex (TDD) communications band, such that both the RF transmit signal and an RF receive signal are associated with the first RF communications band. In an alternate embodiment of the RF communications system, the RF communications system further processes RF signals associated with the first RF communications band and a second RF communications band. A frequency gap may be between the first RF communications band and the second RF communications band. The programmable switching frequency is selected, such that the switching ripple falls outside of both the first RF communications band and the second RF communications band where noise requirements are less strict.

In one embodiment of the first RF communications band and the second RF communications band, the first RF communications band is a frequency division duplex (FDD) transmit band and the second RF communications band is an FDD receive band. In an alternate embodiment of the first RF communications band and the second RF communications band, the first RF communications band is an FDD receive band and the second RF communications band is an FDD transmit band.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIGS. 6A, 6B, 6C, 6D, 6E, 6F, 6G, and 6H are graphs illustrating $3^{rd}$ Generation Partnership Project (3GPP) cellular communications bands associated with the RF communications system illustrated in FIG. 1 according to multiple embodiments of the RF communications system.

FIGS. 7A and 7B are graphs illustrating a first RF communications band associated with the RF communications system illustrated in FIG. 1 according to one embodiment of the RF communications system.

FIGS. 7C and 7D are graphs illustrating the first RF communications band and a second RF communications band associated with the RF communications system illustrated in FIG. 1 according to one embodiment of the RF communications system.

DETAILED DESCRIPTION

Figure 1:
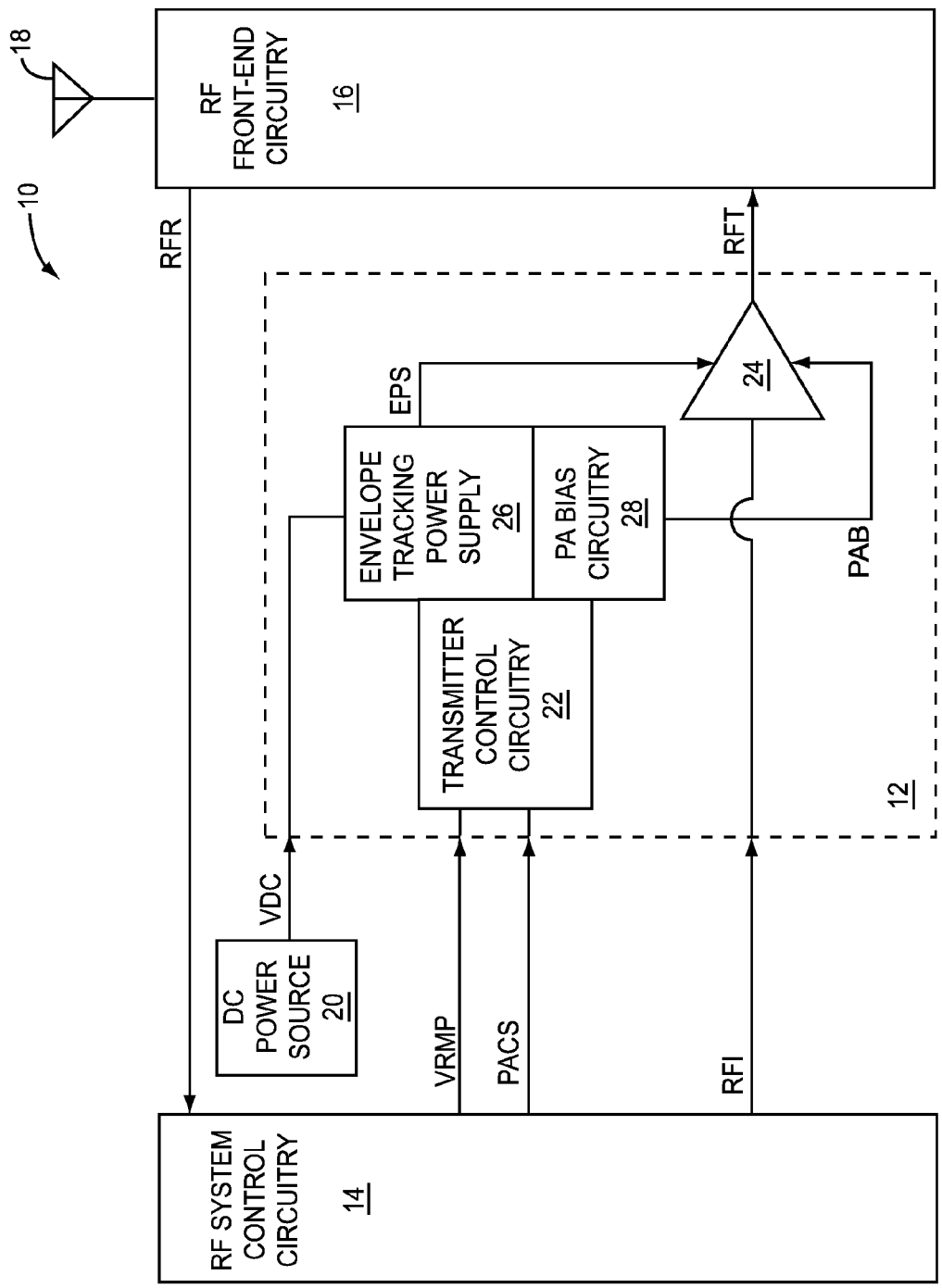
FIG. 1 shows an RF communications system according to one embodiment of the RF communications system.

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Embodiments of the present disclosure relate to an RF communications system, which includes an RF power amplifier (PA) and an envelope tracking power supply. The RF communications system processes RF signals associated with at least a first RF communications band, which has a first bandwidth. The RF PA receives and amplifies an RF input signal to provide an RF transmit signal using an envelope power supply signal. The envelope tracking power supply provides the envelope power supply signal, which has switching ripple based on a programmable switching frequency. The programmable switching frequency is selected to be greater that the first bandwidth.

In one embodiment of the RF communications systems, noise requirements are stricter inside RF transmit bands and RF receive bands than outside of the RF transmit bands and RF receive bands. The switching ripple may introduce noise into an RF transmit path, an RF receive path, or both of the RF communications system. The first RF communications band may be an RF transmit band, an RF receive band, or both. As such, since the programmable switching frequency is greater that the first bandwidth, the switching ripple falls outside of the first RF communications band where noise requirements are less strict.

In one embodiment of the RF communications system, the first RF communications band is a time division duplex (TDD) communications band, such that both the RF transmit signal and an RF receive signal are associated with the first RF communications band. In an alternate embodiment of the RF communications system, the RF communications system further processes RF signals associated with the first RF communications band and a second RF communications band. A frequency gap may be between the first RF communications band and the second RF communications band. The programmable switching frequency is selected, such that the switching ripple falls outside of both the first RF communications band and the second RF communications band where noise requirements are less strict.

In one embodiment of the first RF communications band and the second RF communications band, the first RF communications band is a frequency division duplex (FDD) transmit band and the second RF communications band is an FDD receive band. In an alternate embodiment of the first RF communications band and the second RF communications band, the first RF communications band is an FDD receive band and the second RF communications band is an FDD transmit band.

FIG. 1 shows an RF communications system 10 according to one embodiment of the RF communications system 10. The RF communications system 10 includes RF transmitter circuitry 12, RF system control circuitry 14, RF front-end circuitry 16, an RF antenna 18, and a DC power source 20. The RF transmitter circuitry 12 includes transmitter control circuitry 22, an RF PA 24, an envelope tracking power supply 26, and PA bias circuitry 28. In one embodiment of the RF communications system 10, the RF communications system 10 processes RF signals associated with at least a first RF communications band 80 (FIG. 7A). In an alternate embodiment of the RF communications system 10, the RF communications system 10 processes RF signals associated with the first RF communications band 80 (FIG. 7C) and a second RF communications band 88 (FIG. 7C).

In one embodiment of the RF communications system 10, the RF front-end circuitry 16 receives via the RF antenna 18, processes, and forwards an RF receive signal RFR to the RF system control circuitry 14. In one embodiment of the RF communications system 10, the RF receive signal RFR is associated with the first RF communications band 80 (FIG. 7A). In an alternate embodiment of the RF communications system 10, the RF receive signal RFR is associated with the second RF communications band 88 (FIG. 7C). The RF system control circuitry 14 provides an envelope power supply control signal VRMP and a transmitter configuration signal PACS to the transmitter control circuitry 22. The RF system control circuitry 14 provides an RF input signal RFI to the RF PA 24. The DC power source 20 provides a DC source signal VDC to the envelope tracking power supply 26. In one embodiment of the DC power source 20, the DC power source 20 is a battery.

The transmitter control circuitry 22 is coupled to the envelope tracking power supply 26 and to the PA bias circuitry 28. The envelope tracking power supply 26 provides an envelope power supply signal EPS to the RF PA 24 based on the envelope power supply control signal VRMP. The DC source signal VDC provides power to the envelope tracking power supply 26. As such, the envelope power supply signal EPS is based on the DC source signal VDC. The envelope power supply control signal VRMP is representative of a setpoint of the envelope power supply signal EPS. The RF PA 24 receives and amplifies the RF input signal RFI to provide an RF transmit signal RFT using the envelope power supply signal EPS. The envelope power supply signal EPS provides power for amplification. The RF front-end circuitry 16 receives, processes, and transmits the RF transmit signal RFT via the RF antenna 18. In one embodiment of the RF transmitter circuitry 12, the transmitter control circuitry 22 configures the RF transmitter circuitry 12 based on the transmitter configuration signal PACS.

The PA bias circuitry 28 provides a PA bias signal PAB to the RF PA 24. In this regard, the PA bias circuitry 28 biases the RF PA 24 via the PA bias signal PAB. In one embodiment of the PA bias circuitry 28, the PA bias circuitry 28 biases the RF PA 24 based on the transmitter configuration signal PACS. In one embodiment of the RF front-end circuitry 16, the RF front-end circuitry 16 includes at least one RF switch, at least one RF amplifier, at least one RF filter, at least one RF duplexer, at least one RF diplexer, at least one RF amplifier, the like, or any combination thereof. In one embodiment of the RF system control circuitry 14, the RF system control circuitry 14 is RF transceiver circuitry, which may include an RF transceiver IC, baseband controller circuitry, the like, or any combination thereof. In one embodiment of the RF transmitter circuitry 12, the envelope tracking power supply 26 provides the envelope power supply signal EPS. In one embodiment of the RF transmitter circuitry 12, the envelope power supply signal EPS provides power for amplification and at least partially envelope tracks the RF transmit signal RFT.

Figure 2:
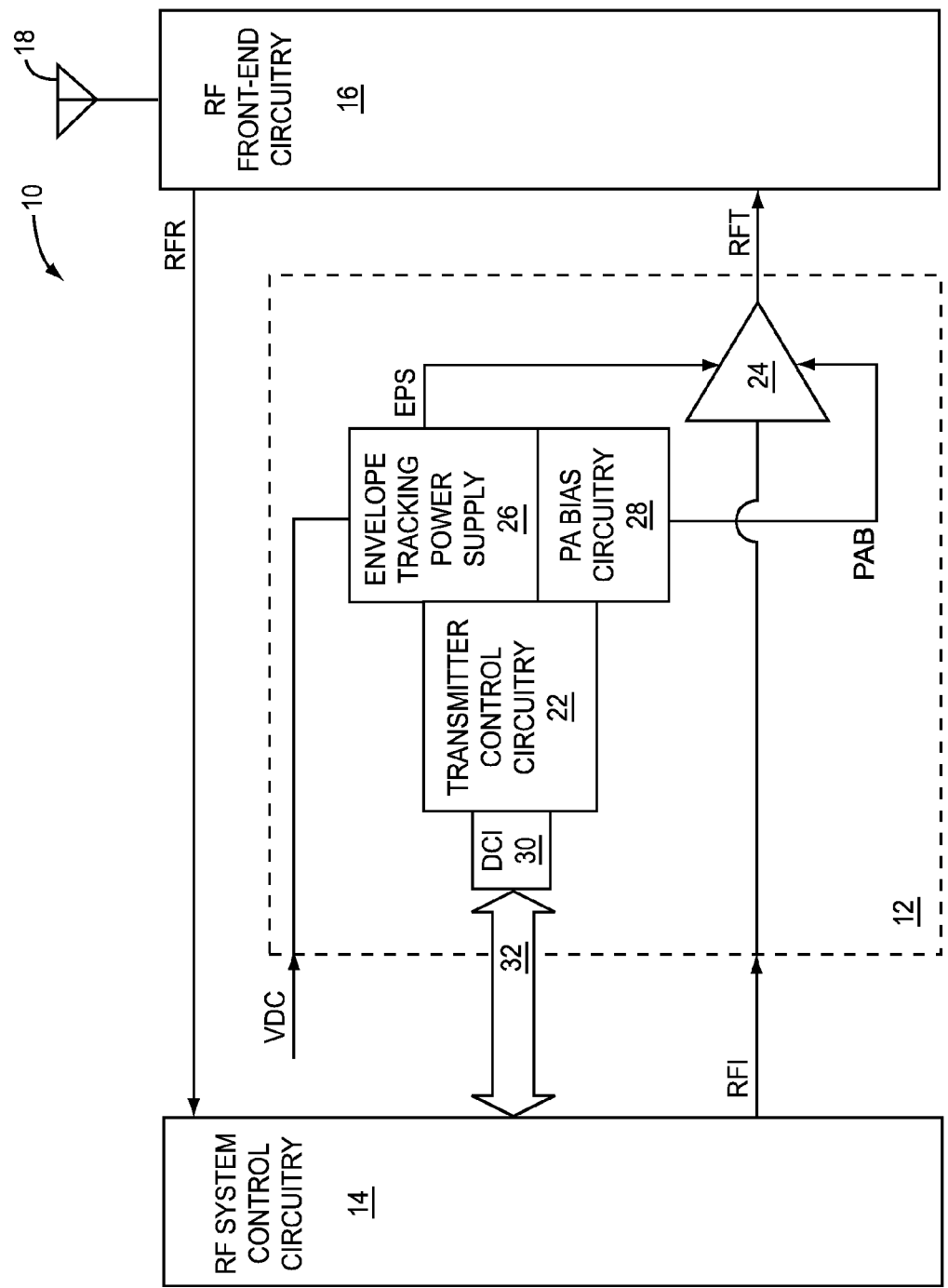
FIG. 2 shows the RF communications system according to an alternate embodiment of the RF communications system.

FIG. 2 shows the RF communications system 10 according to an alternate embodiment of the RF communications system 10. The RF communications system 10 illustrated in FIG. 2 is similar to the RF communications system 10 illustrated in FIG. 1, except in the RF communications system 10 illustrated in FIG. 2, the RF transmitter circuitry 12 further includes a digital communications interface 30, which is coupled between the transmitter control circuitry 22 and a digital communications bus 32. The digital communications bus 32 is also coupled to the RF system control circuitry 14. As such, the RF system control circuitry 14 provides the envelope power supply control signal VRMP (FIG. 1) and the transmitter configuration signal PACS (FIG. 1) to the transmitter control circuitry 22 via the digital communications bus 32 and the digital communications interface 30.

Figure 3:
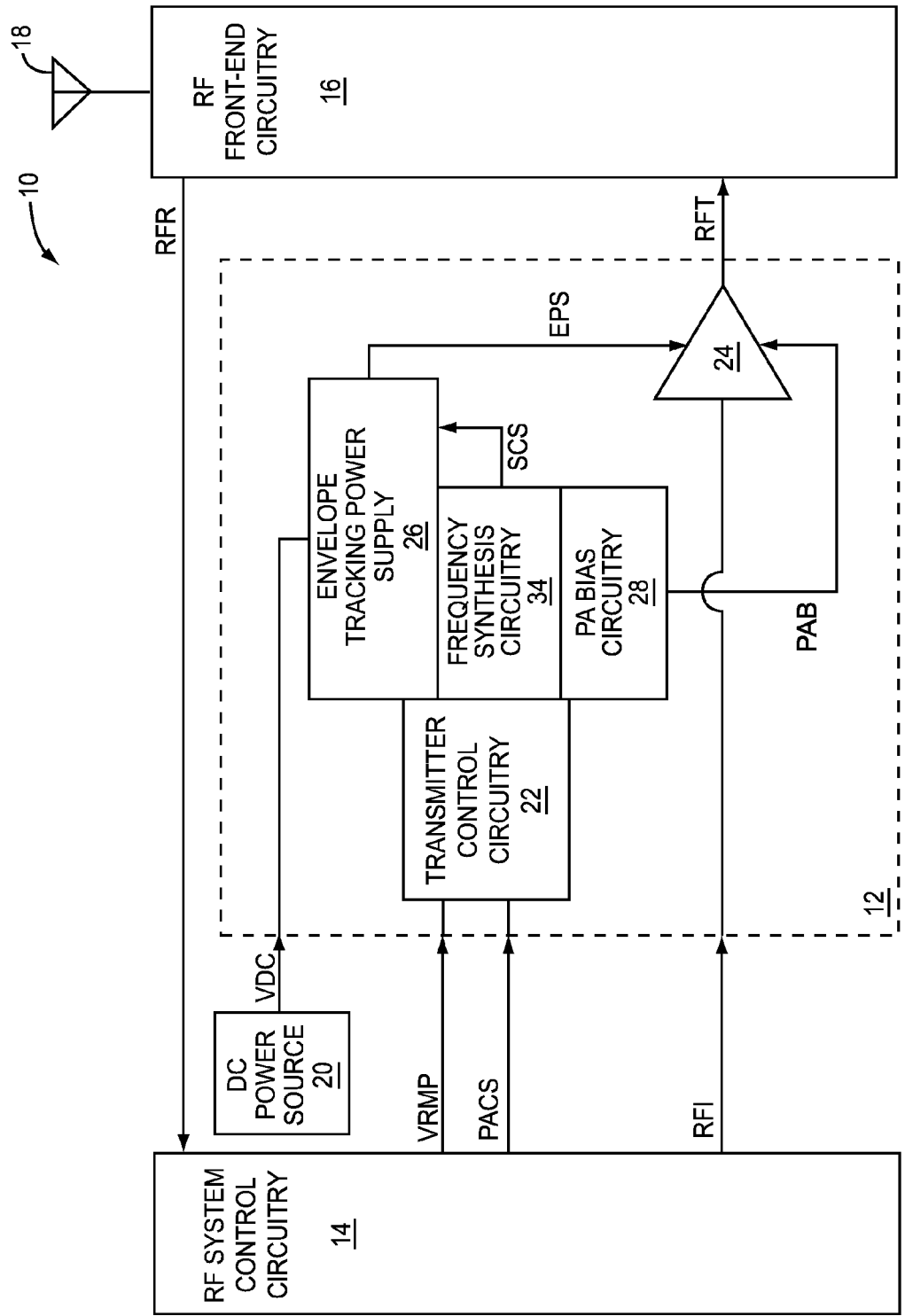
FIG. 3 shows the RF communications system according to an additional embodiment of the RF communications system.
Figure 5:
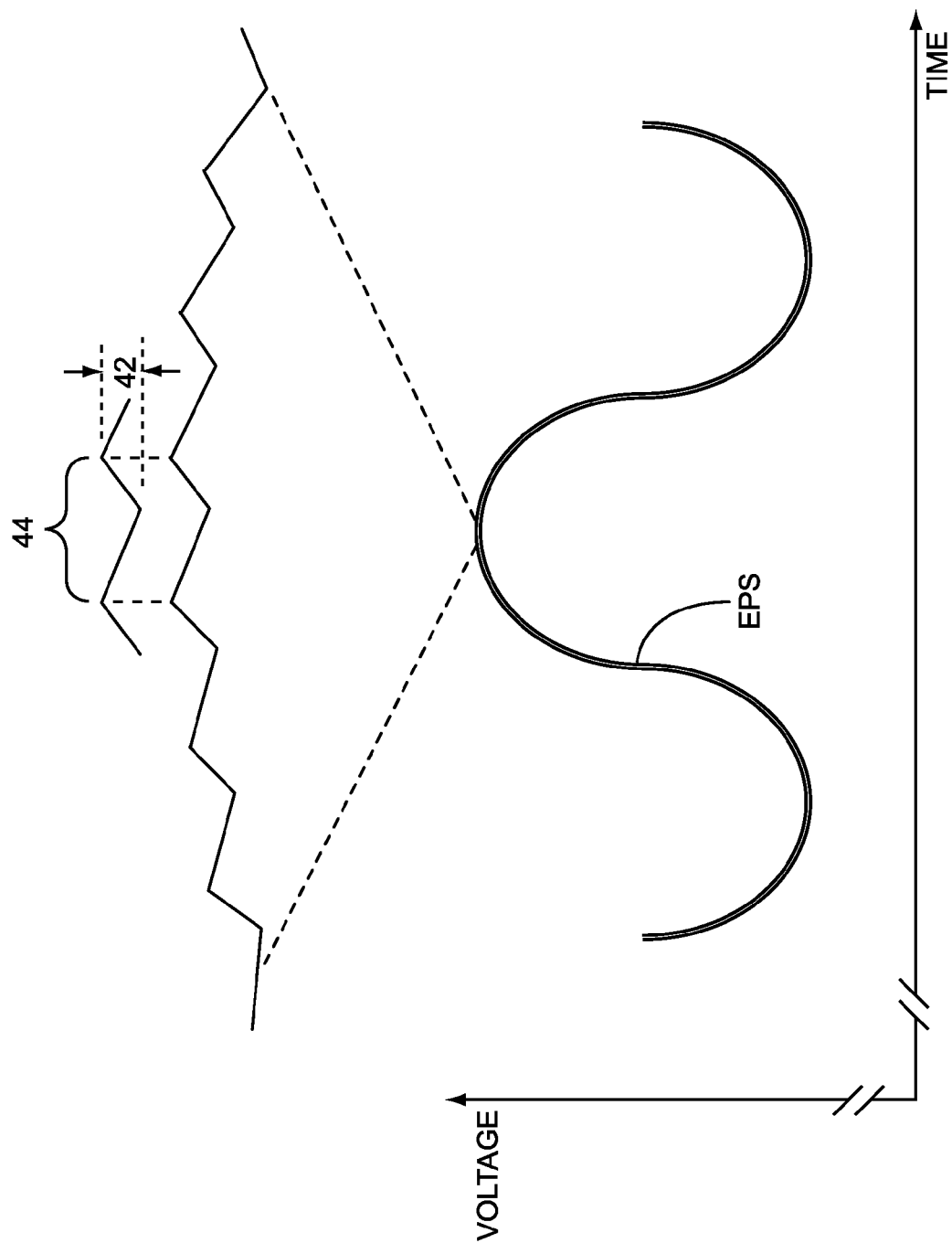
FIG. 5 is a graph illustrating an envelope power supply signal illustrated in FIG. 1 according to one embodiment of the RF communications system.

FIG. 3 shows the RF communications system 10 according to an additional embodiment of the RF communications system 10. FIG. 5 is a graph illustrating the envelope power supply signal EPS illustrated in FIG. 3. The envelope power supply signal EPS illustrated in FIG. 5 varies with time, which is indicative of envelope tracking. Further, a magnified view of the envelope power supply signal EPS illustrated in FIG. 5 shows the switching ripple 42 and the programmable switching period 44. The RF transmitter circuitry 12 illustrated in FIG. 3 is similar to the RF transmitter circuitry 12 illustrated in FIG. 1, except the RF transmitter circuitry 12 illustrated in FIG. 3 further includes frequency synthesis circuitry 34, which is coupled to the transmitter control circuitry 22. The frequency synthesis circuitry 34 provides a switching clock signal SCS to the envelope tracking power supply 26. The envelope power supply signal EPS has the switching ripple 42 and a programmable switching period 44 based on the switching clock signal SCS. The programmable switching period 44 is a reciprocal of a programmable switching frequency. Therefore, a frequency of the switching ripple 42 is based on the programmable switching frequency. As such, in one embodiment of the switching clock signal SCS, the switching clock signal SCS has the programmable switching frequency. The transmitter control circuitry 22 provides indication of the programmable switching frequency to the frequency synthesis circuitry 34.

In one embodiment of the RF communications system 10, the transmitter control circuitry 22 selects the programmable switching frequency based on the first RF communications band 80 (FIG. 7A). In an alternate embodiment of the RF communications system 10, the transmitter control circuitry 22 selects the programmable switching frequency based on the second RF communications band 88 (FIG. 7C). In another embodiment of the RF communications system 10, the transmitter control circuitry 22 selects the programmable switching frequency based on both the first RF communications band 80 (FIG. 7A) and the second RF communications band 88 (FIG. 7C).

In one embodiment of the RF communications system 10, the RF system control circuitry 14 selects the programmable switching frequency based on the first RF communications band 80 (FIG. 7A). In an alternate embodiment of the RF communications system 10, the RF system control circuitry 14 selects the programmable switching frequency based on the second RF communications band 88 (FIG. 7C). In another embodiment of the RF communications system 10, the RF system control circuitry 14 selects the programmable switching frequency based on both the first RF communications band 80 (FIG. 7A) and the second RF communications band 88 (FIG. 7C). The RF system control circuitry 14 provides indication of the programmable switching frequency to the transmitter control circuitry 22 via the transmitter configuration signal PACS.

In general, control circuitry, which may be the RF system control circuitry 14, the transmitter control circuitry 22, or other circuitry, selects the programmable switching frequency. In one embodiment of the RF communications system 10, the RF communications system 10 includes the control circuitry. In one embodiment of the RF communications system 10, the programmable switching frequency is selected, such that the programmable switching frequency is high enough to allow the envelope power supply signal EPS to at least partially track the RF transmit signal RFT.

Figure 4:
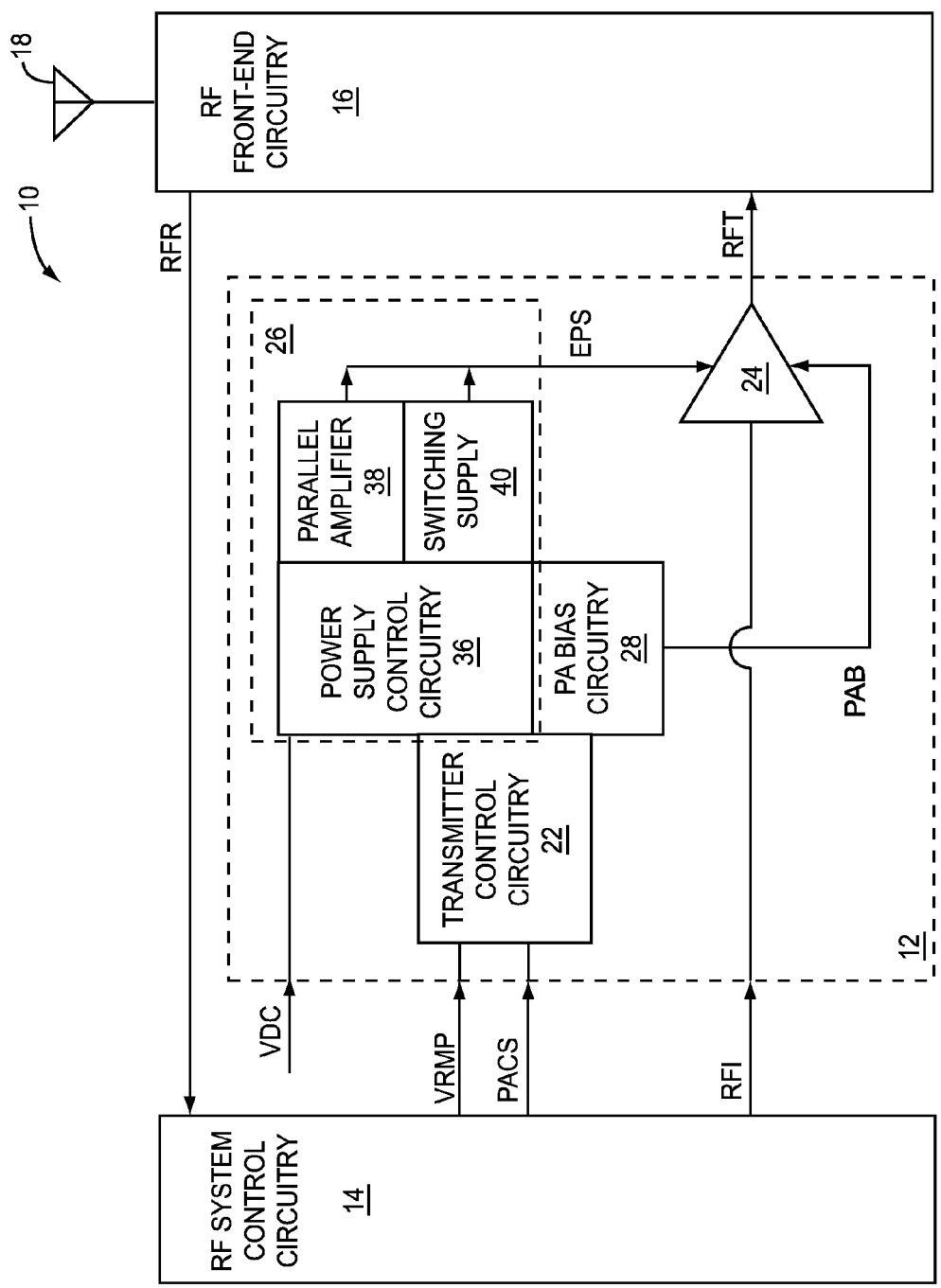
FIG. 4 shows details of an envelope tracking power supply illustrated in FIG. 1 according to one embodiment of the envelope tracking power supply.

FIG. 4 shows details of the envelope tracking power supply 26 illustrated in FIG. 1 according to one embodiment of the envelope tracking power supply 26. The envelope tracking power supply 26 includes power supply control circuitry 36, a parallel amplifier 38, and a switching supply 40. The power supply control circuitry 36 controls the parallel amplifier 38 and the switching supply 40. The parallel amplifier 38 and the switching supply 40 provide the envelope power supply signal EPS, such that the parallel amplifier 38 partially provides the envelope power supply signal EPS and the switching supply 40 partially provides the envelope power supply signal EPS. The switching supply 40 may provide power more efficiently than the parallel amplifier 38. However, the parallel amplifier 38 may provide the envelope power supply signal EPS more accurately than the switching supply 40. As such, the parallel amplifier 38 regulates a voltage of the envelope power supply signal EPS based on the setpoint of the envelope power supply signal EPS, and the switching supply 40 operates to drive an output current from the parallel amplifier 38 toward zero to maximize efficiency. In this regard, the parallel amplifier 38 behaves like a voltage source and the switching supply 40 behaves like a current source. The switching supply 40 may be a primary source of switching ripple 42 (FIG. 5).

In one embodiment of the RF transmitter circuitry 12, the envelope tracking power supply 26 uses active ripple cancellation to reduce a magnitude of the switching ripple 42 (FIG. 5). In one embodiment of the active ripple cancellation, the active ripple cancellation relies on an increase in bandwidth of the parallel amplifier 38. However, by increasing the bandwidth of the parallel amplifier 38, efficiency of the envelope tracking power supply 26 may be reduced.

FIGS. 6A, 6B, 6C, 6D, 6E, 6F, 6G, and 6H are graphs illustrating $3^{rd}$ Generation Partnership Project (3GPP) cellular communications bands associated with the RF communications system 10 illustrated in FIG. 1 according to multiple embodiments of the RF communications system 10. The 3GPP cellular communications bands illustrated in FIGS. 6A, 6B, 6C, 6D, 6E, 6F, 6G, and 6H are frequency division duplex (FDD) communications bands. As such, each 3GPP cellular communications band has an FDD transmit band and an FDD receive band. In this regard, frequencies in any or all of the FDD receive bands may be greater than frequencies in any or all of the corresponding FDD transmit bands, as illustrated in FIGS. 6A, 6B, 6C, 6D, 6E, and 6F. Conversely, frequencies in any or all of the FDD receive bands may be less than frequencies in any or all of the corresponding FDD transmit bands, as illustrated in FIGS. 6G and 6H. The 3GPP cellular communications bands illustrated in FIGS. 6A, 6B, 6C, 6D, 6E, 6F, 6G, and 6H are exemplary and not intended to be all inclusive. Alternate embodiments of the RF communications system 10 may include additional 3GPP cellular communications bands or fewer 3GPP cellular communications bands.

FIG. 6A illustrates a 3GPP cellular communications band #2 according to one embodiment of the RF communications system 10. The 3GPP cellular communications band #2 includes an FDD band #2 RF transmit band 46, an FDD band #2 RF receive band 48, and a frequency gap 50 between the FDD band #2 RF transmit band 46 and the FDD band #2 RF receive band 48. Frequencies in the FDD band #2 RF receive band 48 are greater than frequencies in the FDD band #2 RF transmit band 46. The FDD band #2 RF transmit band 46 is the first RF communications band 80 (FIG. 7C) and the FDD band #2 RF receive band 48 is the second RF communications band 88 (FIG. 7C).

FIG. 6B illustrates a 3GPP cellular communications band #3 according to one embodiment of the RF communications system 10. The 3GPP cellular communications band #3 includes an FDD band #3 RF transmit band 52, an FDD band #3 RF receive band 54, and the frequency gap 50 between the FDD band #3 RF transmit band 52 and the FDD band #3 RF receive band 54. Frequencies in the FDD band #3 RF receive band 54 are greater than frequencies in the FDD band #3 RF transmit band 52. The FDD band #3 RF transmit band 52 is the first RF communications band 80 (FIG. 7C) and the FDD band #3 RF receive band 54 is the second RF communications band 88 (FIG. 7C).

FIG. 6C illustrates a 3GPP cellular communications band #5 according to one embodiment of the RF communications system 10. The 3GPP cellular communications band #5 includes an FDD band #5 RF transmit band 56, an FDD band #5 RF receive band 58, and the frequency gap 50 between the FDD band #5 RF transmit band 56 and the FDD band #5 RF receive band 58. Frequencies in the FDD band #5 RF receive band 58 are greater than frequencies in the FDD band #5 RF transmit band 56. The FDD band #5 RF transmit band 56 is the first RF communications band 80 (FIG. 7C) and the FDD band #5 RF receive band 58 is the second RF communications band 88 (FIG. 7C).

FIG. 6D illustrates a 3GPP cellular communications band #8 according to one embodiment of the RF communications system 10. The 3GPP cellular communications band #8 includes an FDD band #8 RF transmit band 60, an FDD band #8 RF receive band 62, and the frequency gap 50 between the FDD band #8 RF transmit band 60 and the FDD band #8 RF receive band 62. Frequencies in the FDD band #8 RF receive band 62 are greater than frequencies in the FDD band #8 RF transmit band 60. The FDD band #8 RF transmit band 60 is the first RF communications band 80 (FIG. 7C) and the FDD band #8 RF receive band 62 is the second RF communications band 88 (FIG. 7C).

FIG. 6E illustrates a 3GPP cellular communications band #9 according to one embodiment of the RF communications system 10. The 3GPP cellular communications band #9 includes an FDD band #9 RF transmit band 64, an FDD band #9 RF receive band 66, and the frequency gap 50 between the FDD band #9 RF transmit band 64 and the FDD band #9 RF receive band 66. Frequencies in the FDD band #9 RF receive band 66 are greater than frequencies in the FDD band #9 RF transmit band 64. The FDD band #9 RF transmit band 64 is the first RF communications band 80 (FIG. 7C) and the FDD band #9 RF receive band 66 is the second RF communications band 88 (FIG. 7C).

FIG. 6F illustrates a 3GPP cellular communications band #11 according to one embodiment of the RF communications system 10. The 3GPP cellular communications band #11 includes an FDD band #11 RF transmit band 68, an FDD band #11 RF receive band 70, and the frequency gap 50 between the FDD band #11 RF transmit band 68 and the FDD band #11 RF receive band 70. Frequencies in the FDD band #11 RF receive band 70 are greater than frequencies in the FDD band #11 RF transmit band 68. The FDD band #11 RF transmit band 68 is the first RF communications band 80 (FIG. 7C) and the FDD band #11 RF receive band 70 is the second RF communications band 88 (FIG. 7C).

FIG. 6G illustrates a 3GPP cellular communications band #13 according to one embodiment of the RF communications system 10. The 3GPP cellular communications band #13 includes an FDD band #13 RF receive band 72, an FDD band #13 RF transmit band 74, and the frequency gap 50 between the FDD band #13 RF receive band 72 and the FDD band #13 RF transmit band 74. Frequencies in the FDD band #13 RF transmit band 74 are greater than frequencies in the FDD band #13 RF receive band 72. The FDD band #13 RF receive band 72 is the first RF communications band 80 (FIG. 7C) and the FDD band #13 RF transmit band 74 is the second RF communications band 88 (FIG. 7C).

FIG. 6H illustrates a 3GPP cellular communications band #14 according to one embodiment of the RF communications system 10. The 3GPP cellular communications band #14 includes an FDD band #14 RF receive band 76, an FDD band #14 RF transmit band 78, and the frequency gap 50 between the FDD band #14 RF receive band 76 and the FDD band #14 RF transmit band 78. Frequencies in the FDD band #14 RF transmit band 78 are greater than frequencies in the FDD band #14 RF receive band 76. The FDD band #14 RF receive band 76 is the first RF communications band 80 (FIG. 7C) and the FDD band #14 RF transmit band 78 is the second RF communications band 88 (FIG. 7C).

FIGS. 7A and 7B are graphs illustrating the first RF communications band 80 associated with the RF communications system 10 illustrated in FIG. 1 according to one embodiment of the RF communications system 10. In one embodiment of the RF communications system 10 (FIG. 1), the first RF communications band 80 has a first bandwidth 82, as illustrated in FIG. 7A. The programmable switching frequency is selected to be greater than the first bandwidth 82. Since the programmable switching frequency is greater than the first bandwidth 82, the programmable switching frequency of the switching ripple 42 (FIG. 5) falls outside of the first RF communications band 80 where noise requirements are less strict. In one embodiment of the RF communications system 10 (FIG. 1), the RF receive signal RFR (FIG. 1) is associated with the first RF communications band 80 and the RF transmit signal RFT (FIG. 1) is associated with the first RF communications band 80. As such, the first RF communications band 80 is a TDD communications band.

In one embodiment of the RF communications system 10 (FIG. 1), a first guard band 84 is adjacent to the first RF communications band 80, such that frequencies in the first guard band 84 are greater than frequencies in the first RF communications band 80 as illustrated in FIG. 7B. A first guard band-based bandwidth 86 spans the first RF communications band 80 and the first guard band 84. The programmable switching frequency is selected to be greater than the first guard band-based bandwidth 86. The first guard band 84 may be used to compensate for actual error in the programmable switching frequency. Such error may be due to tolerances, adjustment granularity, temperature variations, process variations, voltage variations, the like, or any combination thereof.

FIGS. 7C and 7D are graphs illustrating the first RF communications band 80 and a second RF communications band 88 associated with the RF communications system 10 illustrated in FIG. 1 according to one embodiment of the RF communications system 10. In one embodiment of the RF communications system 10 (FIG. 1), the frequency gap 50 is between the first RF communications band 80 and the second RF communications band 88, as illustrated in FIG. 7C. Frequencies in the second RF communications band 88 are greater than frequencies in the first RF communications band 80. The RF communications system 10 (FIG. 1) processes RF signals associated with the first RF communications band 80 and the second RF communications band 88. In one embodiment of the RF communications system 10 (FIG. 1), the programmable switching frequency is selected, such that the programmable switching frequency of the switching ripple 42 (FIG. 5) falls outside of both the first RF communications band 80 and the second RF communications band 88 where noise requirements are less strict. In an alternate embodiment of the RF communications system 10 (FIG. 1), the programmable switching frequency is selected, such that the programmable switching frequency and a second harmonic of the programmable switching frequency of the switching ripple 42 (FIG. 5) both fall outside of both the first RF communications band 80 and the second RF communications band 88 where noise requirements are less strict.

In one embodiment of the RF communications system 10 (FIG. 1), the first RF communications band 80 has the first bandwidth 82, such that the programmable switching frequency is selected to be greater than the first bandwidth 82. In one embodiment of the RF communications system 10 (FIG. 1), a second bandwidth 90 spans the first RF communications band 80 and the frequency gap 50, such that the programmable switching frequency is further selected to be less than the second bandwidth 90. In one embodiment of the RF communications system 10 (FIG. 1), a third bandwidth 92 spans the first RF communications band 80, the frequency gap 50, and the second RF communications band 88, such that the second harmonic of the programmable switching frequency is further selected to be greater than the third bandwidth 92.

In one embodiment of the RF communications system 10 (FIG. 1), the first RF communications band 80 is a 3GPP cellular communications band and the second RF communications band 88 is a 3GPP cellular communications band. In one embodiment of the RF communications system 10 (FIG. 1), the first RF communications band 80 is an LTE cellular communications band and the second RF communications band 88 is an LTE cellular communications band. In one embodiment of the RF communications system 10 (FIG. 1), the first RF communications band 80 is both a 3GPP cellular communications band and an LTE cellular communications band and the second RF communications band 88 is both a 3GPP cellular communications band and an LTE cellular communications band.

In one embodiment of the RF communications system 10 (FIG. 1), the RF receive signal RFR (FIG. 1) is associated with the first RF communications band 80 and the RF transmit signal RFT (FIG. 1) is associated with the second RF communications band 88. As such, in one embodiment of the RF communications system 10 (FIG. 1), the first RF communications band 80 is an FDD receive band and the second RF communications band 88 is an FDD transmit band.

In one embodiment of the RF communications system 10 (FIG. 1), the RF receive signal RFR (FIG. 1) is associated with the second RF communications band 88 and the RF transmit signal RFT (FIG. 1) is associated with the first RF communications band 80. As such, in one embodiment of the RF communications system 10 (FIG. 1), the second RF communications band 88 is an FDD receive band and the first RF communications band 80 is an FDD transmit band.

In one embodiment of the RF communications system 10 (FIG. 1), the frequency gap 50 is between the first RF communications band 80 and the second RF communications band 88 as illustrated in FIG. 7D. Frequencies in the second RF communications band 88 are greater than frequencies in the first RF communications band 80. The first guard band 84 is adjacent to the first RF communications band 80 and overlaps the frequency gap 50. A second guard band 94 is adjacent to the second RF communications band 88 and overlaps the frequency gap 50.

In one embodiment of the RF communications system 10 (FIG. 1), the first guard band-based bandwidth 86 spans the first RF communications band 80 and the first guard band 84. The programmable switching frequency is further selected to be greater than the first guard band-based bandwidth 86. A second guard band-based bandwidth 96 spans the first RF communications band 80 and a portion of the frequency gap 50 that does not overlap the second guard band 94. In one embodiment of the RF communications system 10 (FIG. 1), the programmable switching frequency is further selected to be less than the second guard band-based bandwidth 96.

In one embodiment of the RF communications system 10 (FIG. 1), a third guard band 98 is adjacent to the second RF communications band 88 and opposite from the second guard band 94, such that frequencies in the third guard band 98 are greater than frequencies in the second RF communications band 88. A third guard band-based bandwidth 100 spans the first RF communications band 80, the frequency gap 50, the second RF communications band 88, and the third guard band 98. In one embodiment of the RF communications system 10 (FIG. 1), the second harmonic of the programmable switching frequency is further selected to be greater than the third guard band-based bandwidth 100.

Any or all of the first guard band 84, the second guard band 94, and the third guard band 98 may be used to compensate for actual error in the programmable switching frequency. Such error may be due to tolerances, adjustment granularity, temperature variations, process variations, voltage variations, the like, or any combination thereof.

Those skilled in the art will recognize improvements and modifications to the embodiments of the present disclosure. All such improvements and modifications are considered within the scope of the concepts disclosed herein and the claims that follow.

What is claimed is:

1. A radio frequency (RF) communications system configured to process RF signals associated with at least a first RF communications band and comprising:
an RF power amplifier (PA) configured to receive and amplify an RF input signal to provide an RF transmit signal using an envelope power supply signal; and
an envelope tracking power supply configured to provide the envelope power supply signal, such that:
the first RF communications band has a first bandwidth;
the envelope power supply signal has switching ripple based on a programmable switching frequency;
the programmable switching frequency is selected to be greater than the first bandwidth;
a first guard band is adjacent to the first RF communications band, such that frequencies in the first guard band are greater than frequencies in the first RF communications band;
a first guard band-based bandwidth spans the first RF communications band and the first guard band; and
the programmable switching frequency is further selected to be greater than the first guard band-based bandwidth.

2. The RF communications system of claim 1 wherein the programmable switching frequency is further selected, such that the programmable switching frequency is high enough to allow the envelope power supply signal to at least partially envelope track the RF transmit signal.

3. The RF communications system of claim 1 wherein the envelope tracking power supply comprises frequency synthesis circuitry configured to provide a switching clock signal having the programmable switching frequency.

4. The RF communications system of claim 3 wherein control circuitry is configured to select the programmable switching frequency.

5. The RF communications system of claim 4 further comprising the control circuitry.

6. The RF communications system of claim 1 wherein the RF communications system is further configured to process RF signals associated with the first RF communications band and a second RF communications band.

7. The RF communications system of claim 6 wherein a frequency gap is between the first RF communications band and the second RF communications band.

8. The RF communications system of claim 7 wherein:
a third bandwidth spans the first RF communications band, the frequency gap, and the second RF communications band; and
the programmable switching frequency is further selected, such that a second harmonic of the programmable switching frequency is greater than the third bandwidth.

9. The RF communications system of claim 7 wherein:
a first guard band is adjacent to the first RF communications band and overlaps the frequency gap;
a first guard band-based bandwidth spans the first RF communications band and the first guard band; and
the programmable switching frequency is further selected to be greater than the first guard band-based bandwidth.

10. The RF communications system of claim 9 wherein:
a second guard band is adjacent to the second RF communications band and overlaps the frequency gap;
a second guard band-based bandwidth spans the first RF communications band and a portion of the frequency gap that does not overlap the second guard band; and
the programmable switching frequency is further selected to be less than the second guard band-based bandwidth.

11. The RF communications system of claim 10 wherein:
a third guard band is adjacent to the second RF communications band and opposite from the second guard band;
a third guard band-based bandwidth spans the first RF communications band, the frequency gap, the second RF communications band, and the third guard band; and
the programmable switching frequency is further selected, such that a second harmonic of the programmable switching frequency is greater than the third guard band-based bandwidth.

12. The RF communications system of claim 6 wherein the first RF communications band is a 3rd Generation Partnership Project (3GPP) cellular communications band and the second RF communications band is a 3GPP cellular communications band.

13. The RF communications system of claim 12 wherein the first RF communications band is a long term evolution (LTE) cellular communications band and the second RF communications band is an LTE cellular communications band.

14. The RF communications system of claim 1 wherein the first RF communications band is a 3rd Generation Partnership Project (3GPP) cellular communications band.

15. The RF communications system of claim 1 further comprising RF front-end circuitry configured to receive and forward an RF receive signal, such that the RF receive signal is associated with the first RF communications band.

16. The RF communications system of claim 15 wherein the RF transmit signal is associated with the first RF communications band, such that the first RF communications band is a time division duplex (TDD) communications band.

17. The RF communications system of claim 1 wherein the RF transmit signal is associated with the first RF communications band.

18. A radio frequency (RF) communications system configured to process RF signals associated with at least a first RF communications band and a second RF communications band, and comprising:
an RF power amplifier (PA) configured to receive and amplify an RF input signal to provide an RF transmit signal using an envelope power supply signal; and
an envelope tracking power supply configured to provide the envelope power supply signal, such that:
the first RF communications band has a first bandwidth;
the envelope power supply signal has switching ripple based on a programmable switching frequency;
the programmable switching frequency is selected to be greater than the first bandwidth; and
a second bandwidth spans the first RF communications band and the frequency gap, such that the programmable switching frequency is further selected to be less than the second bandwidth.

19. A radio frequency (RF) communications system configured to process RF signals associated with at least a first RF communications band and comprising:
RF front-end circuitry configured to receive and forward an RF receive signal, such that the RF receive signal is associated with the first RF communications band;
an RF power amplifier (PA) configured to receive and amplify an RF input signal to provide an RF transmit signal using an envelope power supply signal; and
an envelope tracking power supply configured to provide the envelope power supply signal, such that:
the first RF communications band has a first bandwidth;
the envelope power supply signal has switching ripple based on a programmable switching frequency;
the programmable switching frequency is selected to be greater than the first bandwidth; and
the RF communications system is further configured to process RF signals associated with the first RF communications band and a second RF communications band, such that the RF transmit signal is associated with the second RF communications band.

20. The RF communications system of claim 19 wherein the first RF communications band is a frequency division duplex (FDD) receive band and the second RF communications band is an FDD transmit band.

21. A radio frequency (RF) communications system configured to process RF signals associated with at least a first RF communications band and comprising:
RF front-end circuitry configured to receive and forward an RF receive signal, wherein the RF communications system is further configured to process RF signals associated with the first RF communications band and a second RF communications band, such that the RF receive signal is associated with the second RF communications band;
an RF power amplifier (PA) configured to receive and amplify an RF input signal to provide an RF transmit signal using an envelope power supply signal; and
an envelope tracking power supply configured to provide the envelope power supply signal, such that:
the first RF communications band has a first bandwidth;
the envelope power supply signal has switching ripple based on a programmable switching frequency; and
the programmable switching frequency is selected to be greater than the first bandwidth.

22. The RF communications system of claim 21 wherein the first RF communications band is a frequency division duplex (FDD) transmit band and the second RF communications band is an FDD receive band.

23. A method comprising:
processing radio frequency (RF) signals associated with at least a first RF communications band
receiving and amplifying an RF input signal to provide an RF transmit signal using an envelope power supply signal; and
providing the envelope power supply signal, such that:
the first RF communications band has a first bandwidth;
the envelope power supply signal has switching ripple based on a programmable switching frequency;
the programmable switching frequency is selected to be greater than the first bandwidth;

a first guard band is adjacent to the first RF communications band, such that frequencies in the first guard band are greater than frequencies in the first RF communications band;
a first guard band-based bandwidth spans the first RF communications band and the first guard band; and
the programmable switching frequency is further selected to be greater than the first guard band-based bandwidth.

\* \* \* \* \*